United States Patent [19]

Jacobsen

[11] 4,060,332

[45] Nov. 29, 1977

[54] SPLINE AND GROOVE CONNECTION

[76] Inventor: Kim Jacobsen, 4 Spurvevaenget, Odense, Denmark, 5000

[21] Appl. No.: 629,214

[22] Filed: Nov. 6, 1975

[30] Foreign Application Priority Data

Nov. 14, 1974 Denmark .............................. 5926/74

[51] Int. Cl.² .............................................. F16B 7/00
[52] U.S. Cl. .................... 403/359; 52/239; 52/738
[58] Field of Search ............ 52/758 D, 753 D, 753 K, 52/738, 239; 403/109, 298, 359; 211/148, 177, 182

[56] References Cited

U.S. PATENT DOCUMENTS

| 2,963,131 | 12/1960 | Brockway | 52/239 X |
| 3,086,627 | 4/1963 | Bernard | 52/738 X |
| 3,160,249 | 12/1964 | Pavlecka | 52/738 X |
| 3,186,561 | 6/1965 | Strässle | 52/738 X |
| 3,513,606 | 5/1970 | Jones | 52/282 X |

FOREIGN PATENT DOCUMENTS 1,564,568   3/1969   France .................................. 403/298

Primary Examiner—Wayne L. Shedd
Attorney, Agent, or Firm—Diller, Brown, Ramik & Wight

[57] ABSTRACT

An assembling set comprising a central rod member consisting of a hub and a number of flanges projecting substantially radially from the hub and being at their ends remote from the hub terminated by arc-shaped heads, adjacent heads having between them a longitudinal groove and a longitudinal cavity connected only with this groove, a structural part, i.e., a peg or a plate being engaged in one of the grooves in the rod member.

6 Claims, 13 Drawing Figures

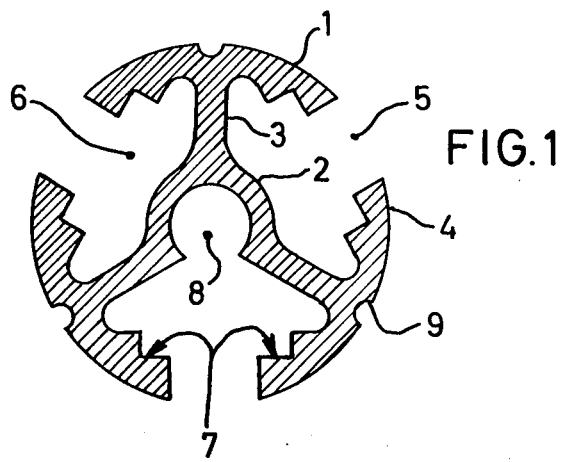
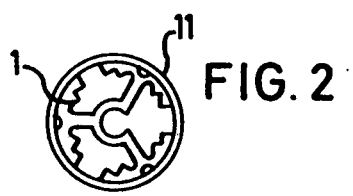
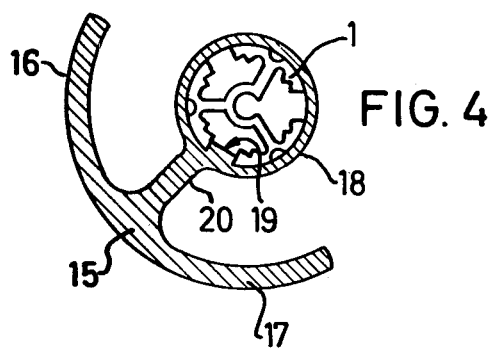
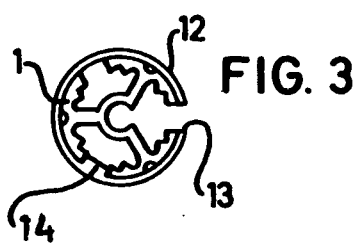

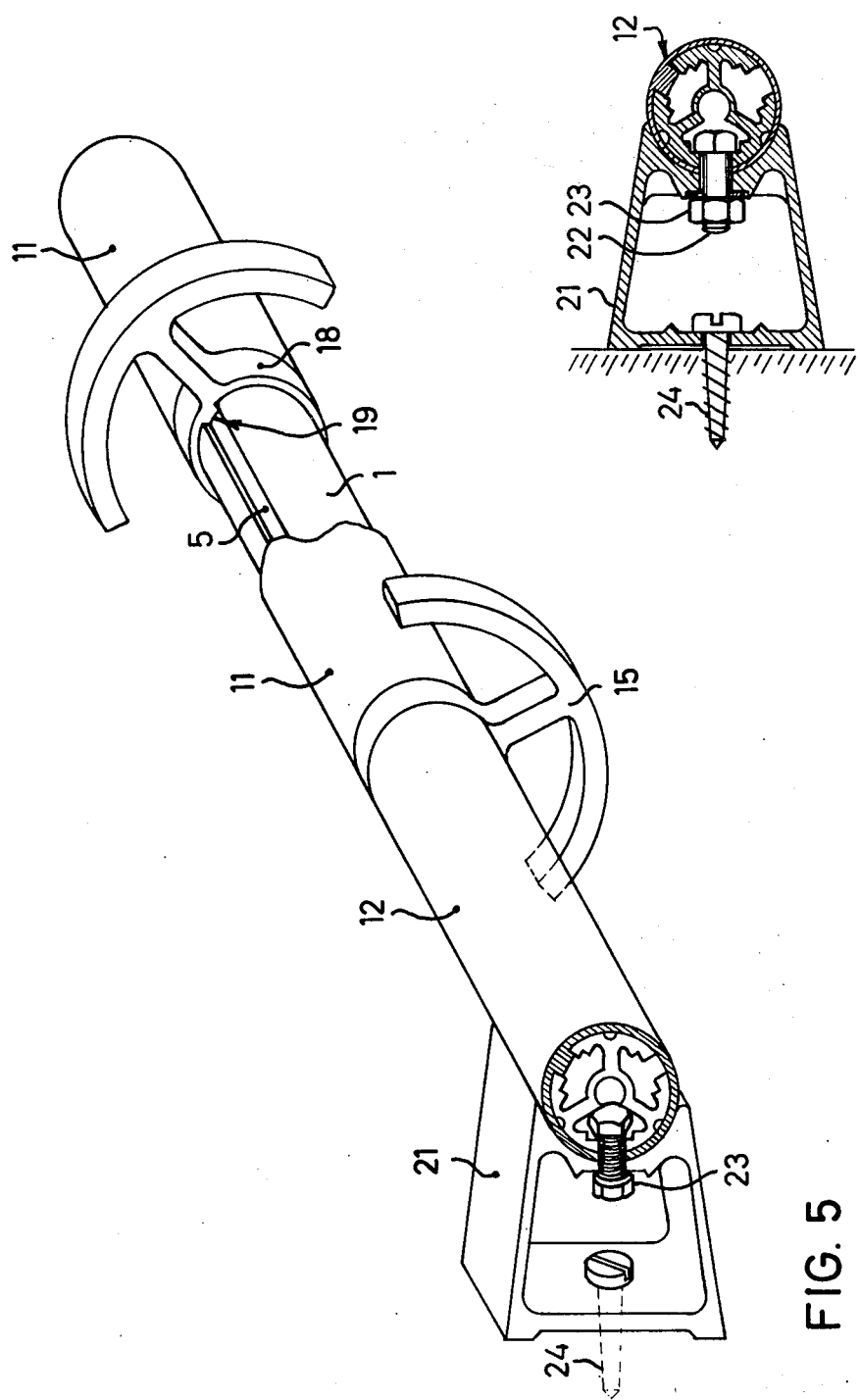

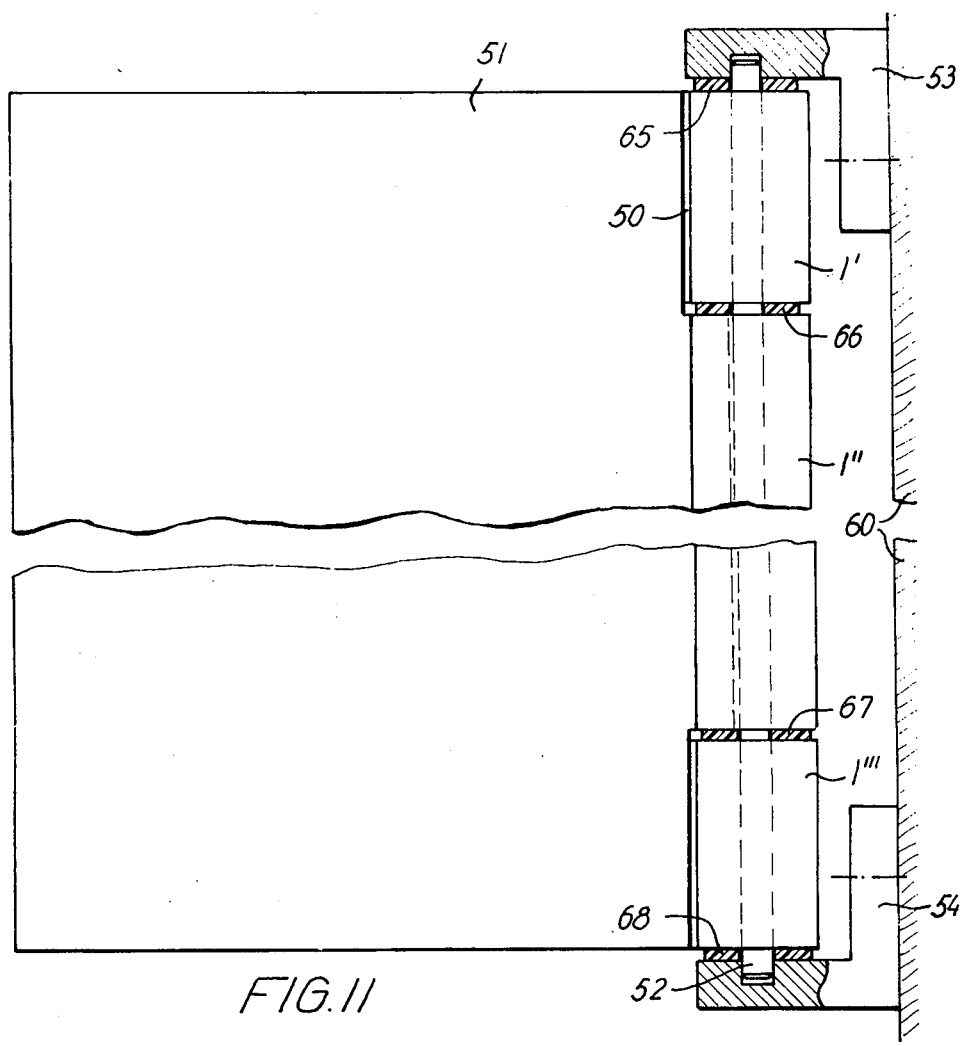
FIG. 11
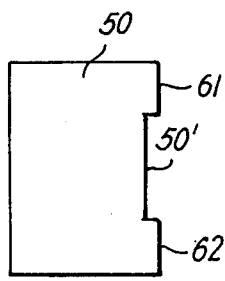
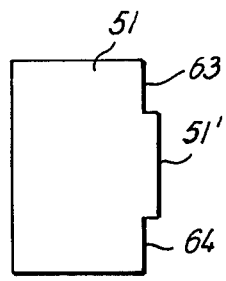
FIG. 12
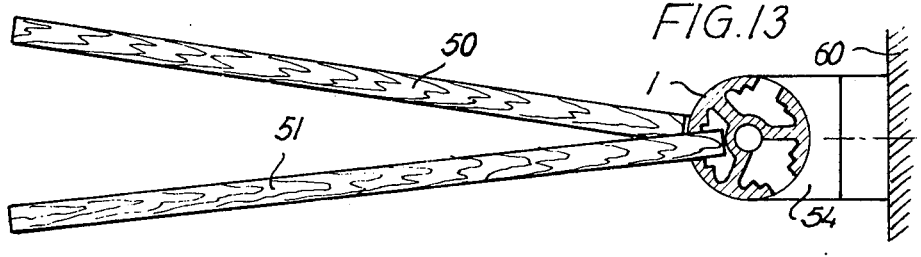
FIG. 13

SPLINE AND GROOVE CONNECTION

BACKGROUND OF THE INVENTION

The invention relates to an assembling set comprising a central rod member and at least one structural part engaging the rod member by means of a feather and groove connection.

Such an assembling set may for instance be used as a display set in shops or at exhibitions or for the arrangement of shelves, pivoting trays, plates etc.

It is known to arrange structural parts, such as shelves or plates, on a member, e.g., a metal member of for instance square cross section, with the use of hoops which in the desired place on the member are clamped transversely to the longitudinal axis of the member.

Thereby the structural parts can be placed in any desired position in the longitudinal direction of the member. However, such a construction has the following drawbacks.

The clamping of the hoops will rather early cause a deformation of the metal member and will at any rate damage the surface of the metal member. When several metal members located alongside each other are to be used, it may be rather difficult at any rate time-consuming to adjust the hoops so that e.g. shelves lie precisely horizontally.

From the Norwegian published application No. 129608 an assembling set is known comprising a rod member provided with longitudinal slots into which plates can be fitted. The plates are along one edge designed with a suitable profile for engaging the slots in the rod member. The ends of the rod member are threaded, and by means of threaded sleeves or nuts it is possible to clamp the plates inserted in the individual slots to the rod member.

Such a construction has various drawbacks. One drawback is that a machining of the rods, with a view to providing a screw thread, and of the sleeves, also for providing a thread, is required. This machining makes the assembling set more expensive. The other drawback is that the mounting work requires the use of tools for the clamping together of the individual parts, and this also makes the assembling set more expensive and inevitably causes marks to be left on the outer surfaces of the individual parts. An additional drawback is that this construction offers a relatively small number of combination possibilities.

SUMMARY OF THE INVENTION

It is the object of the invention to remedy these drawbacks, and with a view to this an assembling set according to the invention is characterized in that the central member consists of a hub and a number of flanges projecting substantially radially from the hub, which flanges at their ends remote from the hub are terminated by arc-shaped heads in such a way that adjacent heads between them leave a longitudinal groove and a longitudinal cavity connected only with this groove, and in that the structural part comprises a portion engaging the groove.

By means of the said feather and groove connection in relation with the structural part and the central rod member the structural parts can be placed in different angular positions corresponding to the individual cavities. Such a rod member comprising a central hub and a number of flanges projecting substantially radially from the hub and having arc-shaped heads can easily be produced as an extruded rodmember and can easily be cut into pieces of a suitable length as required. The cutting of the rod member is in itself a rather inexpensive operation. The various grooves in the member offer the possibility of placing the structural parts in different positions around the member.

BRIEF DESCRIPTION OF THE DRAWINGS

Below, the invention is explained in greater detail with reference to the schematical drawing in which FIG. 1 shows a cross-section through a rod member for an assembling set according to the invention, FIG. 2 shows a section on a smaller scale through the rod member equipped with a spacer tube with closed profile, FIG. 3 shows a corresponding section through the rod member equipped with a spacer tube with open profile, FIG. 4 shows a corresponding section through the rod equipped with a peg, FIG. 5 shows a perspective view of a clothes rack with the rod member secured to a wall by means of a hoop, FIG. 6 shows a section through the rod member shown in FIG. 5 and through the hoop, FIG. 11 shows a side elevation of the rod member with two plates, FIG. 12 shows the two plates for use in the arrangement shown in FIG. 11 and FIG. 13 shows a section through the rod member with plates shown in FIG. 11.

DETAILED DESCRIPTION

Figure 7:
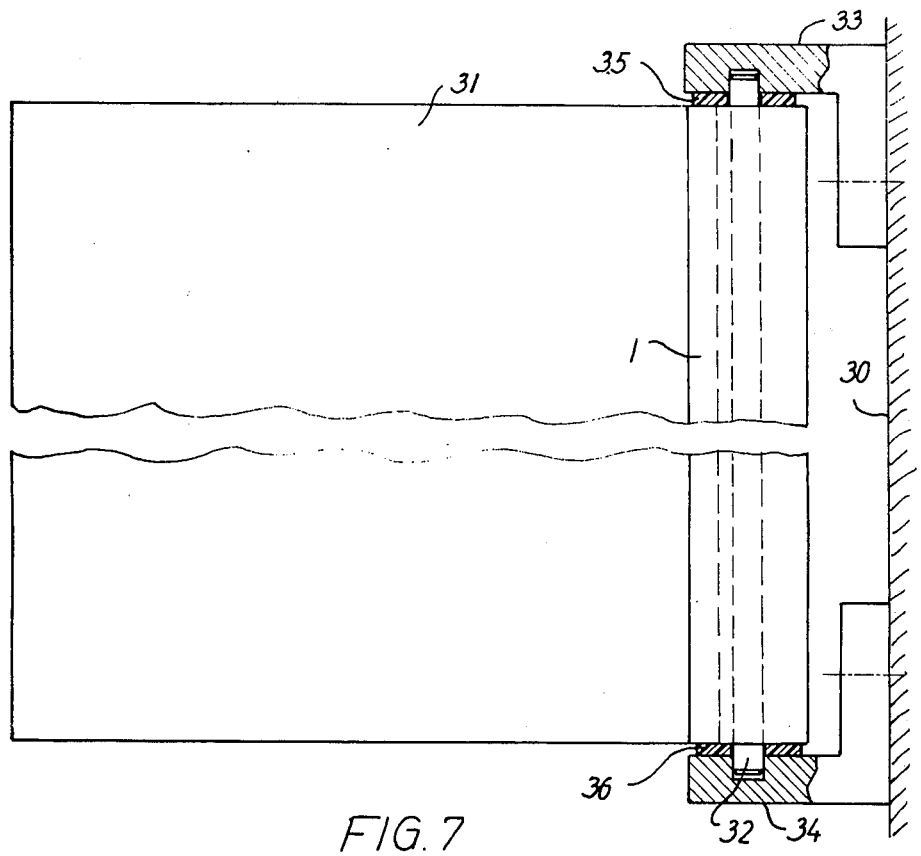
FIG. 7 shows a rod member with a plate seen in side elevation.

FIG. 1 shows the section through a central rod member 1. The member, which in the embodiment shown has a circular external outline, may for instance be made of aluminium. The rod member comprises a substantially circular hub 2 with a number of radially projecting flanges 3. At its end remote from the hub 2, each flange is terminated with an arc-shaped head 4. In the embodiment shown, the rod member comprises three flanges 3, having a relative angular displacement of 120°, and three associated heads 4. In the circumferential direction the heads 4 are of such an extent that a groove 5 is formed between two adjacent heads 4. These grooves extend in the longitudinal direction of the rod member. In the rod member, the individual flanges and the associated heads form cavities 6 of such a shape that each groove 5 is undercut as shown by 7. Thus, the said cavities provide room for instance of hexagonal screw heads or for pins or for clips, the purpose of which is to be explained below. In the hub 2 of the rod member an axial hole 8 is provided which via a slot between two radial flanges 3 opens into the corresponding cavity 6 between said two flanges. The purpose of the axial hole is to be explained below. On their outside and substantially aligned with the flanges the heads 4 have longitudinal semi-circular grooves 9, the purpose of which is to be explained below.

Around the central rod member 1, spacer tubes 11 with closed profile as shown in FIG. 2 or spacer tubes 12 with open profile as shown in FIG. 3 can be fitted. In the latter case, the spacer tube 12 is provided with a longitudinal slot 13 of the same width as the groove 5 in the central rod member 1 and with an internal, longitudinal projection 14 also of the same width as the groove 5. Such a spacer tube, which may also be made of aluminium and may for instance be produced by extrusion, has its slot 13 and its projection 14 located in such a way relative to each other that the slot 13 is aligned with one of the grooves in the central rod member, when the projection in inserted into another one of these grooves. Thereby the spacer tube 12 can be locked in the direction of rotation relative to the rod member 1.

Such spacer tubes, either in the form of a tube with closed profile as shown in FIG. 2 or of a tube with open profile as shown in FIG. 3, are used for determining the space between other structural parts which may also be mounted on the central rod member.

FIG. 4 shows a combination where a peg 15 has been mounted on the rod member. Said peg comprises a tubular portion 18, the internal diameter of which at least approximately corresponds to the outer diameter of the rod member 1, and a flange 20 which projects substantially radially from this tubular portion 18 and at a certain distance from the tubular portion 18 is terminated by two arc-shaped legs 16 and 17 which in the embodiment shown are concentric with the tubular portion. On the inner surface of the tubular portion 18 a projection 19 is provided having such dimensions that it can be placed in one of the grooves 5 in the central rod member 1. A peg of the type here shown may easily be produced by the cutting of an extruded section of aluminium or plastics material.

FIG. 5 shows a perspective view of a clothes rack composed of a central rod member 1 of the type shown in FIG. 1, spacers 11 of the type shown in FIG. 2, a spacer 12 of the type shown in FIG. 3, pegs 15 of the type shown in FIG. 4 as well as a hoop 21 for mounting the clothes rack on a wall. For the sake of clarity, one of the two pegs 15 shown in FIG. 5 has been mounted with a relative angular displacement of 120° from the other peg. Part of the spacer tube 11 placed between the two pegs 15 has been cut away to show that the internal projection 19 in the tubular portion 18 of the peg has been inserted into one of the grooves 5 in the central rod member 1. The pegs 15 will, however, normally be locked in the same groove in the central rod memeber, that is to say placed in alignment with each other.

The clothes rack shown in FIG. 5 is mounted on a wall by means of a suitable number of hoops or supports 21. In the place, where such a support is to be mounted, a spacer tube 12 of the type shown in FIG. 3 is normally used. The corresponding cavity 6 in the rod member is accessible via the slot 13 in the tube and the corresponding groove 5 in the central rod member. A bolt 22 is inserted into the undercut groove in the rod member 1 in such a way that the head of the bolt is located in the said cavity in the rod member and is held locked in the direction of rotation in this cavity.

The support which may be used for securing the clothes rack on a wall may, as shown in FIG. 5 and in section in FIG. 6, be constituted by a piece of, e.g., hollow aluminum section with a substantially trapezoidal cross-section and with an approximately semi-circular bearing surface corresponding to the outer diameter of the spacer tube. A nut 23, placed inside the trapezoidal support 21, serves for clamping the rod member 1 and other parts mounted thereon on the support after the latter has been secured to the wall for instance by means of a screw 24. As mentioned above, the hub 2 of the rod member has a central hole 8. In this hole, a thread-forming screw may be mounted, the open communication between the hole 8 and one of the cavities 6 giving the necessary elasticity for the tightening of the screw. Such a screw may for instance be used for clamping an end disc to the rod member.

Figure 8:
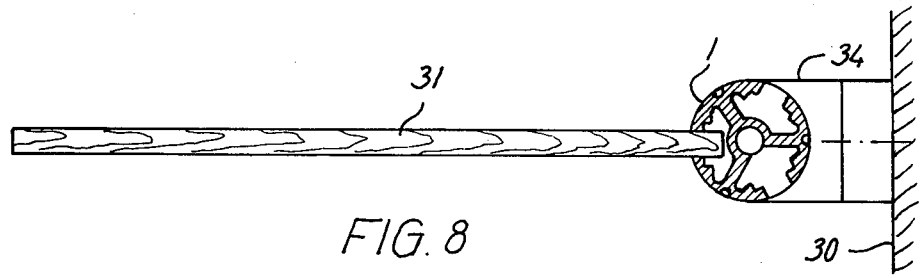
FIG. 8 shows a section through the rod member with plate shown in FIG. 7.

FIG. 7 shows a side elevation of a rod member with a plate, and FIG. 8 shows an end view of this rod member with said plate.

In one of the grooves in the rod memeber 1 a plate 31 has been inserted. In the axial hole in the rod member 1 a shaft 32 is inserted which at the ends of the rod member is journalled in two hoops 33 and 34, so that the rod member and thereby the structural part can turn in relation to the hoops 33 and 34. These two hoops may be secured to a carrying surface 30, for instance a wall, in such a way that the plate 31 for instance is vertical. Between the ends of the rod member 1 and the hoops 33 and 35, respectively, friction-reducing discs 35 and 36, e.g., Teflon discs, may be placed.

Such an arrangement offers the possibility of turning the plate in relation to the wall. Instead of being mounted on a wall by means of such hoops, this arrangement may be erected with a rod member which extends from floor to ceiling or which functions as a standard so that the plate, or possibly several such plates mounted on the rod member, can turn 360°.

Figure 9:
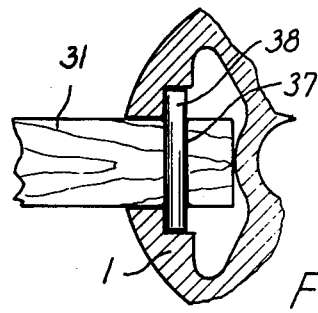
FIG. 9 shows a section through part of a structural part and of the rod member, in which the structural part is secured by means of pins.

FIG. 9 shows a way of securing the structural part on the rod member 1. The edge of the structural part 31 to be inserted into one of the cavities 6 in the rod memeber 1 is designed with transverse holes 37, into which pins 38 are fitted. The size of these pins 38 is such that they can be placed in the undercut part 7 of the rod member 1, cf. FIG. 1. The structural part provided with pins is slid into the cavity from one end of the rod member, and by a suitable dimensioning of the individual parts and the positioning of the pin holes the result is achieved that the structural part is held securely in the rod member. If it be desired, for instance in order to change the arrangement achieved, the structural part can easily be disengaged from the rod member by being slid out of the rod member.

Figure 10:
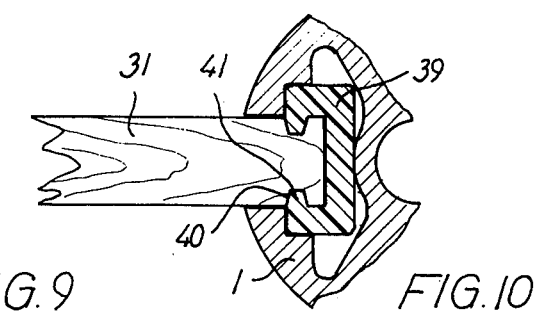
FIG. 10 shows a section corresponding to FIG. 9 in the case that the structural part is secured by means of a clip.

Another way of securing the structural part in the rod member in illustrated in FIG. 10. The edge of the stuctural part 31 to be inserted into one of the cavities 6 in the rod member 1 is designed with a groove 40 extending along the edge—or possibly with one groove at either side of the structural part. A substantially U-shaped clip 39 of metal, plastics or rubber material surrounds the edge of the structural part 31 and is shaped with internal ribs 41 to engage the grooves 40. The structural part 31 provided with the clip 39 is slid into said cavity from one end of the rod member, and by a suitable dimensioning of the clip and the grooves and a suitable placing of these grooves in relation to the edge of the structural part the result is achieved that the structural part is held securely in the rod member. Also in this case the structural part can be removed from the rod member by being slid out axially in relation to the axis of the rod member.

The same principle as illustrated in FIGS. 7 and 8 may be used for mounting several plates on rod members having a common shaft. FIGS. 11 and 12 show an arrangement in which two plates 50 and 51 are mounted on three rod members. In the embodiment shown, both plates 50 and 51 are inserted in the same groove in the rod members.

In the same way as shown in FIGS. 7 and 8, a through shaft 52 is inserted in the axial hole in the rod members, which shaft has its ends journalled in hoops 53 and 54 which may be secured to a wall 60. On plate 50 is shaped with a cut 50' between two lugs 61 and 62, whereas the other plate 51 is shaped with two cuts 63 and 64, one at either side of a lug 51'.

The central rod member is divided into three pieces 1', 1" and 1'" having lengths corresponding to the width of the lugs 61, 62 and 51', respectively. The three rod memeber pieces 1', 1" and 1'" are mounted on the same through shaft 52, and the lugs on the two plates are inserted into a groove in the associated rod member pieces 1', 1" and 1'", respectively.

In this way the two plates can turn in relation to each other. Friction-reducing discs 65, 66, 67 and 68 may be placed between the hoops and the plates and between the plates, respectively. The plates may be secured in the groove in the same way as mentioned with reference to FIGS. 9 and 10 or even only by glueing. It should be remarked that the plates can also be shaped with an expansion or thickening which is located at the edge and the outer shape of which at least partially corresponds to the shape of the cavity.

The assembling set described offers many constructional possibilities with a few standard elements.

The rod member may for instance be placed vertically, e.g., suspended from a ceiling by means of an end plate, not shown, or held clamped between ceiling and floor or be clamped as a standard on the floor, also by means of an end plate, not shown. Instead of the pegs shown it is possible to mount corner fittings for boxes, shelves, etc. These corner fittings should only be provided with a tubular portion in the same way as the tubular portion 18 for the peg 15 with internal projections 19. In this case the fitting can be locked in certain positions in relation to the rod member which can be mounted stationarily or rotatably.

The three grooves in the central rod member offer the possibility of placing the hoops, the pegs and the fittings in many different positions, and with spacer tubes of different, possibly standardized lengths, users may assemble many different constructions.

Normally, all the components incorporated in the assembling set described will be made of metal. They can all be produced by the cutting of metal sections, which is advantageous as regards the cost. Normally the individual components will have dimensions suited for each other. It is possible, however, to compensate for differences, if any, in dimensions by a cord, e.g., a nylon cord, being placed in the grooves 9 in the central rod member 1 between the head 4 and the spacer tubes or the structural parts. By this means, play between the individual components is compensated for.

What is claimed is:

1. An assembling set comprising an elongated rod member and a structural part, said rod member comprising an elongated hub, a plurality of elongated flanges radiating from said hub, an elongated individual head carried by each flange with each head being spaced from an adjacent head, said heads and said flanges defining a longitudinal groove between each adjacent pair of heads and a longitudinal cavity between each pair of flanges, each groove opening into a respective one of said cavities, said heads having arcuate outer surfaces in transverse section wherein said rod member is generally circular in cross-section, said structural part including a tubular portion telescoped over said rod member, and said structural part having a radially inwardly extending projection seated in one of said grooves and anchoring said structural part against rotation around said rod member, said tubular part being of limited axial extent as compared to said rod member and there being at least one tubular spacer telescoped over said rod member and axially positioning said structural part.

2. An assembling set according to claim 1 wherein both said one groove and said projection are of rectangular cross-section.

3. An assembling set according to claim 1 wherein said structural part including said projection are of an extruded construction.

4. An assembling set comprising at least three elongated rod members and at least two structural parts in the form of panel-like members; each rod member comprising an elongated hub, a plurality of elongated flanges radiating from said hub, an elongated individual head carried by each flange with each head being spaced from an adjacent head, said heads and said flanges defining a longitudinal groove between each adjacent pair of heads and a longitudinal cavity between each pair of flanges, each groove opening into a respective one of said cavities, and an axial bore through said hub; a mounting element extending through said hubs and mounting said rod members in adjacent axial alignment and for relative rotation, one of said structural parts having longitudinally spaced edge portions projecting therefrom adjacent opposite ends thereof, said edge portions extending through aligned grooves and into cavities of two remotely spaced ones of said rod members to form a first unit, the second of said structural parts having an edge portion projecting from a central part of a side thereof and extending through a groove into a cavity of a central one of said rod members, said second structural part and said central rod member forming a second unit, and said units being in slightly angularly displaced relation about said mounting element.

5. The assembling set of claim 4 together with friction members disposed between adjacent ones of said rod members and in engagement therewith for resisting relative annular displacement of said units.

6. The assembling set of claim 4 together with mounting brackets receiving remote ends of said mounting element, and friction members disposed between said mounting bracket and adjacent ends of adjacent ones of said rod members for resisting rotation of said rod members on said mounting element.

* * * * *